Dec. 6, 1960  F. H. BELL  2,963,532
INSULATED THERMOCOUPLE
Filed March 12, 1959
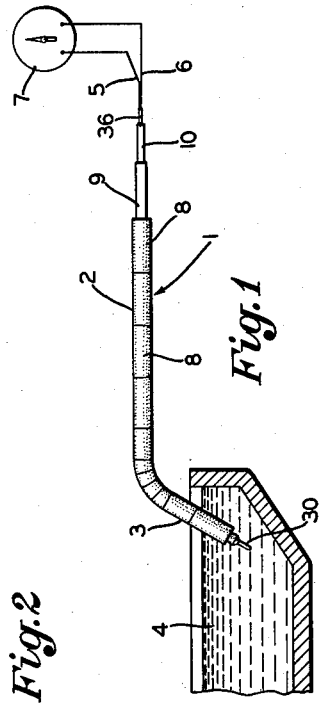
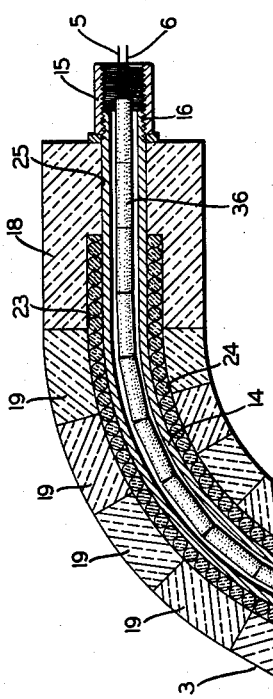
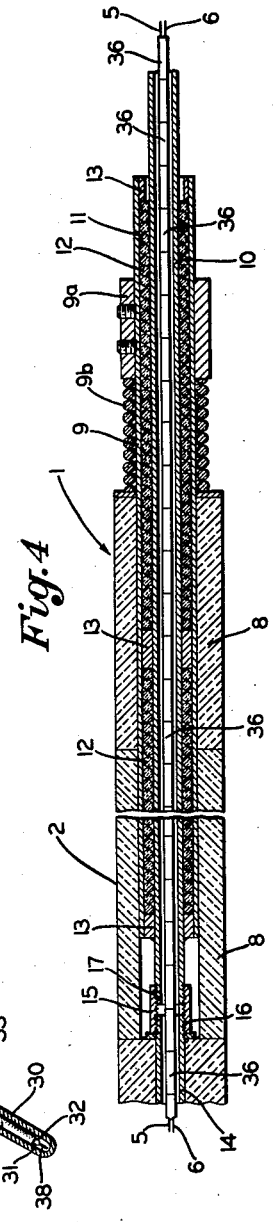
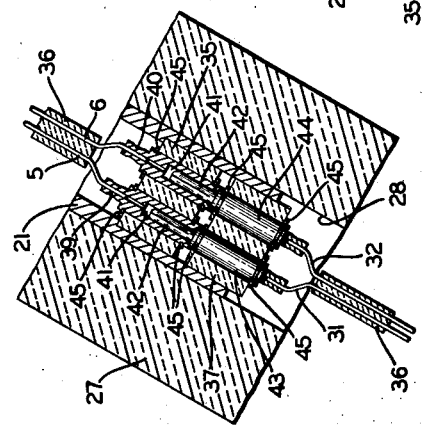
INVENTOR.
*Francis H. Bell*
BY
ATTORNEYS

United States Patent Office 2,963,532
Patented Dec. 6, 1960

2,963,532

INSULATED THERMOCOUPLE

Francis H. Bell, 3705 Cleveland Ave. S., Canton, Ohio

Filed Mar. 12, 1959, Ser. No. 798,891

5 Claims. (Cl. 136—4)

This invention relates to thermocouples and more particularly it pertains to an improved insulated thermocouple having readily detachable portions for easy repair and maintenance. It constitutes an improvement over my Patent No. 2,631,179.

Thermocouples of the immersion type are used for determining temperatures of molten metals. Originally such thermocouples were encased in an elongated insulated member. Such a construction provided insulation for the sensitive thermocouple wires when the assembly was immersed in the high temperature bath of the molten metal for brief periods of time.

Heretofore such prior thermocouples have been unsatisfactory due to inadequate insulation. Plain graphite insulation alone in a thickness which was satisfactory for convenient handling was not adequate for protecting the sensitive thermocouple wires at extremely high molten metal temperatures.

It had been found that where long lengths of thermocouple wires composed of platinum (Pt) and of platinum-rhodium (Pt-Rh) alloy were used, the extremely high temperatures embrittled the Pt-Rh thermocouple wire. After repeated exposures to the temperatures of the molten bath, the heating and cooling caused the Pt-Rh wire eventually to break. The constant replacement of long lengths of the Pt-Rh wire is wasteful and expensive.

It has been found also that the thermocouple assembly may be improved by providing more adequate insulation between outer and inner tubes of the thermocouple shaft. The expense of maintenance of the thermocouple is greatly reduced by providing a shortened thermocouple unit of Pt and Pt-Rh wires disposed at the working end of the thermocouple and having compensated lead wires to which the thermocouple unit wires are separately attached. By providing relatively short thermocouple unit wires, only a low percentage of the Pt and Pt-Rh wires need be replaced.

In addition, certain types of fabricated insulation on thermocouple lead wires became charred and absorbed moisture which directly damaged the wires and required frequent replacement. Such prior thermocouples were rendered inoperative for unreasonable lengths of time because of the necessity of taking the thermocouples to a repair shop and subsequently returning them for use. The device of the present invention is an improvement over such prior thermocouples in that the sensitive thermocouple Pt and Pt-Rh wires are easily and quickly replaceable without the necessity of taking the entire thermocouple assembly out of service for long periods of time.

Accordingly, it is an object of this invention to provide an insulated thermocouple having a greatly improved thermocouple Pt and Pt-Rh wire unit.

It is another object of this invention to provide an insulated thermocouple having a readily replaceable thermocouple Pt and Pt-Rh wire unit.

It is another object of this invention to provide an insulated thermocouple having a short thermocouple wire unit and having connecting compensated lead wires extending therefrom.

Another object of this invention is to provide an insulated thermocouple having an improved insulation shield which is moisture-proof and char-proof.

Finally, it is an object of this invention to provide an insulated thermocouple which accomplishes the foregoing objects and desiderata in a simple, effective, and inexpensive manner.

These and other objects and advantages apparent to those skilled in the art from the following description and claims may be attained, the stated results achieved, and described difficulties overcome by the discoveries, principles, apparatus, parts, combinations, subcombinations and elements which comprise the present invention, the nature of which is set forth in the following statement, a preferred embodiment of which—illustrative of the best mode in which applicant has contemplated applying the principles—is set forth in the following description, and which is particularly and distinctly pointed out and set forth in the appended claims forming part hereof.

The improved insulated thermocouple construction of the present invention may be stated in general terms as including an elongated tube having open ends, a plurality of sleeves of graphite fitted in end-to-end relation on the tube and extending beyond one open end thereof, the sleeve extending beyond said open end of the tube being detachably mounted for ready access to the end of the tube, a pair of compensated lead wires within the tube and extending through the other open end to a location within said one open end, the compensated lead wires being contained within a plurality of porcelain beads, and the ends of the compensated lead wires being separately secured to socket means secured within and closing said open end of the elongated tube. The thermocouple construction also includes a detachable thermocouple unit including a pair of thermocouple wires having corresponding ends joined and having the other ends separately secured to plugs insertable in the socket means, an end closure for said detachable graphite sleeve, the closure including a central bore for receiving the thermocouple unit, a quartz tube extending from the bore of the end closure and having a closed end beyond the end closure, and the joined ends of the thermocouple wires extending to the closed end of the quartz tube.

Referring to the drawings in which a preferred embodiment of the invention is shown by way of example:

Figure 1 is an elevational view of a thermocouple having one end immersed in a molten metal bath and having the other end connected to a pyrometer;

Fig. 2 is an enlarged vertical sectional view of the head portion of the thermocouple.

Fig. 3 is an enlarged sectional view through the connectors of the thermocouple wires; and Fig. 4 is a sectional view of the arm portion of the thermocouple assembly.

Similar numerals refer to similar parts throughout the several views of the drawings.

In Fig. 1 a thermocouple is generally indicated at 1. It includes an elongated arm portion 2 and a shorter head portion 3 which extends at an angle to the arm portion and which is adapted for immersion in a bath of molten metal 4. Lead wires 5 and 6 extend outwardly from the open end of the arm portion 2 remote from the head portion 3, which wires extend to a temperature measuring instrument or pyrometer 7.

The thermocouple 1 is an elongated tubular member consisting of a plurality of thermal shock absorbing members or graphite sleeves 8 that are mounted on an elongated outer tube 9 in end-to-end abutment as shown in Fig. 4. Within the tube 9 an inner tube 10 is provided and both tubes are separated by an annular space 11 in which heat insulation means 12 such as asbestos is disposed. At spaced intervals the tubes 9 and 10 are provided with spaced bushings 13 for holding the tubes apart and rigid. On the tube 9 means for absorbing thermal expansion of the graphite sleeves 8 is provided which includes a collar 9a and a spring 9b, which spring is secured between the collar and graphite sleeve for accommodating thermal expansion of the several sleeves 8 and holding them together at all times.

As shown at the right of the thermocouple 1 in Fig. 4, the tube 10 is connected to a tube 14 by a threaded coupling 15 which engages adjacent threaded end portions 16 and 17 of the tubes 10 and 14. The tube 14 is arcuate in shape as shown in Fig. 2 and is provided with a plurality of thermal shock absorbing members or graphite sleeves 18, 19, and 20. All of the sleeves 18, 19, and 20 are disposed in end-to-end abutment on the tube 14 and are held tightly in place on the curved tube 14 by the coupling 15 at one end and by a tube 21 which is secured to the opposite end of the tube 14 such as by threads 22 at the lower end of the graphite sleeve 20.

Each of the sleeves 18, 19, and 20 has a central bore 23 that is larger than the diameter of the tube 14 to provide space for insulation material such as corded asbestos 24. The sleeves 18 and 20 have reduced bore portions 25 and 26, respectively, by which the coupling 15 and tube 21 are seated tightly against the outer ends of said sleeves.

As shown in Fig. 2, the lower end of the head portion 3 is provided with a heat insulating member or graphite sleeve 27 having a central bore 28 that accommodates the tube 21 over one portion thereof. The upper end of the sleeve 27 is threaded at 29 for engagement with a correspondingly threaded lower portion of the sleeve 20. In this manner the lower end of the head portion 3 may be removed quickly and easily for repair and maintenance of the thermocouple elements located therein.

The head portion 3 also includes a detachable closure having a protective sheath or quartz tube 30 in which thermocouple wires 31 and 32 are provided. An upper portion of the quartz tube 30 is permanently secured within an annular heat insulating member or graphite sleeve 33. The outer surface of the sleeve 33 is tapered inwardly slightly and is seated in an outwardly tapered portion 34 of the bore 28. In this manner the sleeve 33 is seated in the open end of the bore 28 with a friction-tight fit and is readily removable therefrom for repair and maintenance.

The foregoing assembly sets forth the insulating protective portions of the thermocouple 1. Other parts include the lead wires 5 and 6 which are compensated lead wires, one of which is composed of copper and the other of which is composed of a copper-nickel alloy including one percent nickel. The lead wires 5 and 6 extend from the pyrometer 7 through the tubes 10 and 25 to one portion of a wire connector 35. The wires 5 and 6 are enclosed within a plurality of short insulators or porcelain beads 36 which include two spaced longitudinal apertures through which the wires 5 and 6 extend. The porcelain beads 36 are insulators for both heat and electric current.

The thermocouple wires 31 and 32 are connected at their upper ends to another portion 37 of a wire connector from which the wires extend to the lower end of the quartz tube 30 (Fig. 2) where the wires are joined together at 38 such as by twisting or welding. Between the joint 38 and the connector 37 the wires 31 and 32 extend through heat insulating members or porcelain beads 36.

As shown in Fig. 3, the lower ends of the lead wires 5 and 6 are seated in metal sockets 39 and 40 mounted in spaced relationship within the connector 35 that is preferably composed of porcelain to provide heat and electric insulation between the sockets 39 and 40. The lower ends of the sockets 39 and 40 have similar enlarged bores 41 for the receipt of similar prongs 42. The prongs 42 are part of metal members 43 and 44 to which the upper ends of the wires 31 and 32 are secured. The members 43 and 44 are disposed in the wire connector 37 which like the connector 35 is preferably composed of porcelain. The sockets 39 and 40, as well as the members 43 and 44, are retained against longitudinal movement in their respective connectors 35 and 37 by similar snap rings 45. The wires 5 and 6 and the wires 31 and 32 are connected to their corresponding sockets 39 and 40 and connector members 43 and 44 either by clamping the members on the ends of the wires or by silver solder.

The thermocouple 1 may be used for a minimum of 20 or 30 readings before the wires 31 and 32, composed of platinum and platinum-rhodium alloy, become brittle due to repeated heating and cooling and eventually break. When the break occurs the wires 31 and 32 are replaced simply by unscrewing the sleeve 27 from the sleeve 20 and detaching the wire connector 37 from the wire connector 35 by pulling the prongs 42 from the socket bores 41. The detachable unit including the wire connector 37 and the wires 31 and 32 is replaced by a new unit and the sleeve 27 is then replaced on the threaded portion 29 of the sleeve 20. The change takes place in a few minutes and the thermocouple is again in condition for use.

Inasmuch as the thermocouple 1 includes short segments of platinum and platinum-rhodium wires 31 and 32 instead of long lengths of such wires extending from the joint 38 to the pyrometer as in prior constructions, the lead wires 5 and 6 must be compensated lead wires which are composed of copper and copper-nickel alloy in order to obtain a proper reading on the pyrometer 7. The copper lead wire is connected to the platinum-rhodium alloy wire and the copper-nickel alloy lead wire is connected to the platinum wire. The use of copper and copper-nickel alloy lead wires is preferred because, among other things, such wires are not subject to the deteriorating effect of repeated heating and cooling such as is the case with the platinum and platinum-rhodium wires 31 and 32.

The advantage gained by using compensated lead wires 5 and 6 composed of copper and copper-nickel alloy which is not susceptible to deterioration due to repeated heating and cooling cycles is twofold. Such lead wires 5 and 6 are less susceptible to the damaging effect of other elements such as contamination due to acid fumes and foreign matter existing in and immediately above the molten metal 4 as well as in the tubes 10 and 14, which fumes and matter penetrate the insulating sleeves and tubes and inevitably attack the lead wires, notwithstanding the best precautions taken to prevent such penetration. The copper wire and copper-nickel wire are more durable than are the platinum and platinum-rhodium wires 31 and 32.

There is another advantage of the improved construction of the present invention over prior thermocouple devices. During insertion of the thermocouple in a bath of molten metal such as steel for measuring temperature, the protective sheath or quartz tube 30 sometimes breaks. With prior constructions, if the end of the thermocouple were inserted a considerable distance such as two feet into the metal bath, the liquid metal would rise up into the internal portion of the thermocouple for a similar distance and ruin the entire end portion of the thermocouple. With the construction of the instant device, however, when the quartz tube 30 is broken, the connectors 35 and 37 serve as plugs against the flow of liquid metal into the tube 21 and subsequently into the tube 26. The internal portions including the thermocouple unit connector 37, tube 21, and sleeve 27 are the only members that need to be replaced and the entire thermocouple may be readily restored to operating condition with minimum of loss of time and expense.

The device of the present invention provides an improved thermocouple having insulation which reduces the heat penetration from an average of 1500° F. to 475° for the compensated lead wires. By providing a detachable thermocouple element consisting of platinum and platinum-rhodium wires which is readily replaceable, the thermocouple is a more desirable instrument because it is readily available for use at all times except for the few minutes necessary to replace broken platinum-rhodium wires. The operator of such a thermocouple may carry replaceable platinum and platinum-rhodium wire elements in his pocket for replacement when necessary.

Moreover, the device of the present invention is one of greatly reduced cost due to the use of minimum lengths of platinum and platinum-rhodium wire elements. The market price for such wire is high and the initial cost plus replacement costs constituted an objection about which the users of prior thermocouples complained. The use of a detachable element or unit results in a more practical thermocouple temperature control program for any prospective user where the thermocouple has a replaceable unit that overcomes the prior prospect of extended periods of "down time" for a thermocouple each time the platinum-rhodium wire broke. Finally, the wire may be salvaged and returned to the manufacturer, which further minimizes the cost of maintenance and repair.

In the foregoing description certain terms have been used for brevity, clearness and understanding, but no unnecessary limitations have been implied therefrom as such words are used for descriptive purposes and are intended to be broadly construed.

Moreover, the embodiment of the improved construction illustrated and described herein is by way of example and the scope of the present invention is not limited to the exact construction shown.

Having now described the invention, construction, operation and use of a preferred embodiment thereof and the advantageous, new and useful results obtained thereby; the new and useful insulated thermocouple and reasonable mechanical equivalents thereof obvious to those skilled in the art are set forth in the appended claims.

I claim:

1. An insulated thermocouple having an elongated tube, a first sleeve of thermal shock-absorbing material around the tube, the tube having an end portion extending beyond the sleeve, a second sleeve of thermal shock-absorbing material detachably mounted on the first sleeve and around the end portion of the tube, the second sleeve having a portion extending beyond the tube end portion, detachable closure means including a closed end tube of heat resistant material detachably seated within the second sleeve and extending outwardly therefrom, a pair of lead wires extending through the elongated tube to a location within said end portion of the tube, the ends of the wires being secured within one member of a plug and socket means which is seated snugly within the end portion of the tube, a thermocouple unit including the other member of said plug and socket means and including a pair of thermocouple wires extending from said other member through the closed end tube, and said thermocouple wires having outer ends joined at a location within the closed end tube.

2. An insulated thermocouple having an elongated tube, a first sleeve of thermal shock-absorbing material around the tube, the tube having an end portion extending beyond the sleeve, a second sleeve of thermal shock-absorbing material detachably mounted on the first sleeve and around the end portion of the tube, the second sleeve having a portion extending beyond the tube end portion, a closure of thermal shock-absorbing material detachably seated within said second sleeve portion and extending outwardly therefrom and having a central bore therethrough, a closed end tube of heat resistant material seated within and extending outwardly from the bore of the closure, a pair of lead wires extending through the elongated tube to a location within said end portion of the tube, the ends of the wires being secured within one member of a plug and socket means which are seated snugly within the end portion of the tube, a thermocouple unit including the other member of said plug and socket means and including a pair of thermocouple wires extending from said other member through the closed end tube, and said thermocouple wires having outer ends joined at a location within the closed end tube.

3. An insulated thermocouple having an elongated tube, a first sleeve of thermal shock-absorbing material around the tube, the tube having an end portion extending beyond the sleeve, said end portion including a tube coupling secured to and having a diameter greater than the bore of the first sleeve, the coupling and the first sleeve having end-to-end abutting surfaces, a second sleeve of thermal shock-absorbing material detachably mounted on the first sleeve, the second sleeve surrounding and extending beyond the tube coupling, detachable closure means including a closed end tube of heat resistant material detachably seated within the second sleeve and extending outwardly therefrom, a pair of lead wires extending through the elongated tube to a location within said end portion of the tube, the ends of the wires being secured within one member of a plug and socket means which is seated snugly within the tube coupling, a thermocouple unit including the other member of said plug and socket means and including a pair of thermocouple wires extending from said other member through the closed end tube, and said thermocouple wires having outer ends joined at a location within the closed end tube.

4. The insulated thermocouple construction set forth in claim 3 in which the detachable closure means includes a closure of thermal shock-absorbing material snugly seated within the second sleeve and extending outwardly therefrom and having a central bore therethrough, and in which the closed end tube of heat-resistant material is seated within the bore of the closure.

5. The insulated thermocouple construction of claim 3 in which the other member of the plug and socket means is snugly seated within the tube coupling.

References Cited in the file of this patent

UNITED STATES PATENTS

| | | |
|---|---|---|
| 2,463,427 | Richards | Mar. 1, 1949 |
| 2,631,179 | Bell | Mar. 10, 1953 |
| 2,672,493 | Tingle et al. | Mar. 16, 1954 |
| 2,706,411 | Bircher | Apr. 19, 1955 |
| 2,785,216 | Winner | Mar. 12, 1957 |

OTHER REFERENCES

Trans. Am. Foundrymen's Assn., vol. 55, 1947, pp. 505–506.